(12) United States Patent  (10) Patent No.: US 8,380,257 B2
Jeong et al.  (45) Date of Patent: Feb. 19, 2013

(54) SWING-TYPE MOBILE COMMUNICATION TERMINAL AND SWING DEVICE THEREOF

(75) Inventors: Dong Jeong, Gumi-si (KR); Yoo-Seok Yoon, Seoul (KR); Byung-Yeol Ko, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1257 days.

(21) Appl. No.: 11/841,417

(22) Filed: Aug. 20, 2007

(65) Prior Publication Data

US 2008/0076480 A1  Mar. 27, 2008

(30) Foreign Application Priority Data

Sep. 26, 2006 (KR) .......................... 10-2006-0093438
Jan. 15, 2007 (KR) .......................... 10-2007-0004245

(51) Int. Cl.
*H04M 1/00* (2006.01)
(52) U.S. Cl. ............... 455/575.1; 455/575.4; 455/575.3; 455/575.8; 455/90.3; 455/550.1
(58) Field of Classification Search ............... 455/550.1, 455/556, 575.1, 575.3, 575.4; 379/433.12, 379/433.13
See application file for complete search history.

(56) References Cited

U.S. PATENT DOCUMENTS

2004/0106429 A1* 6/2004 Park et al. ................... 455/550.1
2004/0132499 A1* 7/2004 Abe ............................... 455/566
2004/0203517 A1* 10/2004 Park et al. ..................... 455/90.3
2004/0224729 A1* 11/2004 Watanabe et al. ........... 455/575.3
2005/0090288 A1* 4/2005 Stohr et al. ..................... 455/566
2005/0111172 A1* 5/2005 Wang ............................. 361/680
2006/0172764 A1* 8/2006 Makino ....................... 455/550.1
2007/0281675 A1* 12/2007 Pletikosa et al. .............. 455/418
2007/0293283 A1* 12/2007 Inubushi et al. ............ 455/575.1
2008/0004083 A1* 1/2008 Ohki et al. ..................... 455/566

FOREIGN PATENT DOCUMENTS

| EP | 1791328 A1 * | 5/2007 |
|---|---|---|
| EP | 1796350 A1 * | 6/2007 |
| JP | 2005-109971 A | 4/2005 |
| KR | 20-0371528 Y1 | 1/2005 |
| KR | 10-2006-0058880 A | 6/2006 |
| KR | 10-2006-0098849 A | 9/2006 |
| WO | 2006/030607 A1 | 3/2006 |
| WO | WO 2006030607 A1 * | 3/2006 |
| WO | 2006/034949 A1 | 4/2006 |
| WO | WO 2006038499 A1 * | 4/2006 |

* cited by examiner

*Primary Examiner* — Kiet Doan
*Assistant Examiner* — Dung Lam
(74) *Attorney, Agent, or Firm* — Jefferson IP Law, LLP (57) ABSTRACT

A swing-type mobile communication terminal and a swing device for the mobile terminal are disclosed. The mobile communication terminal includes a main body housing having a plurality of first keys on its top face and a swing housing having a display unit on its top face. A swing device connects the main body housing with the swing housing so that the swing housing moves along a predetermined path while facing the main body housing to perform a first swing and a second, successive swing. After the first swing, the swing housing is positioned together with the main body housing in the shape of "┬" and covers an upper portion of the main body housing. After performing the second swing, the swing housing is aligned with the longitudinal direction of the main body housing.

24 Claims, 12 Drawing Sheets

SWING-TYPE MOBILE COMMUNICATION TERMINAL AND SWING DEVICE THEREOF

PRIORITY

This application claims the benefit under 35 U.S.C. §119(a) of a Korean Patent Application filed in the Korean Intellectual Property Office on Sep. 26, 2006 and assigned Serial No. 2006-93438 and a Korean Patent Application filed in the Korean Intellectual Property Office on Jan. 15, 2007 and assigned Serial No. 2007-4245, the entire disclosures of both of which are hereby incorporated by reference.

BACKGROUND OF THE INVENTION

1. Field of the Invention

The present invention generally relates to a mobile communication terminal such as a Digital Multimedia Broadcasting (DMB) phone, a game phone, a chatting phone, a camera phone, an MP3 phone, a cellular phone, a Personal Communication Service (PCS) phone, a Personal Digital Assistant (PDA), and a Hand Held Phone (HHP). More particularly, the present invention relates to a swing-type mobile communication terminal that allows convenient viewing and a swing device for the mobile communication terminal.

2. Description of the Related Art

In general, a "mobile communication terminal" is an electronic apparatus carried with a user to perform wireless communication. The wireless communication may be voice communication, message transmission, file transmission, video communication, or a camera function. Additionally, the portable communication terminal may serve as a personal agent by managing phone numbers and personal schedules.

In terms of portability, such mobile communication terminals tend to be compact, slim, and light, and are easy to grip. They also include multimedia availability for a wide variety of functions such as entertainment functions including game services. Future mobile communication terminals are expected to incorporate more functions and have more uses, including video communication, games, Internet access, and camera functions as well as voice communication.

Conventional mobile communication terminals may be classified into various types according to their appearance and in consideration of their portability and convenience. For example, conventional mobile terminals may be classified as bar-type communication terminals and folder-type communication terminals. A bar-type communication terminal has a single housing shaped like a bar in which data input/output devices, an antenna device, and transmission/reception devices are mounted. A folder-type communication terminal has a folder coupled to a single bar-shaped housing by a hinge device in such a manner that the folder can be rotated to be folded towards and unfolded away from the housing.

In one example of a folder-type mobile communication terminal, a folder is rotatably coupled to a main body by a hinge device, keys are disposed on the main body, and a display unit is disposed on the folder of the folder-type mobile communication terminal. These features help make the portable terminal smaller and increase the portability of the terminal. One example of a folder-type mobile communication terminal is disclosed in U.S. Pat. No. 6,865,406, which is assigned to the assignee of the present invention. In the disclosed folder-type mobile communication terminal, a camera lens housing is mounted in a hinge device.

Mobile communication terminals may also be further classified as swing-type communication terminals and sliding-type communication terminals based upon the method of opening and closing the communication terminals. In a swing-type communication terminal, two housings are coupled to each other to allow one housing to rotate relative to the other while the two housings face each other.

One example of a swing-type communication terminal is disclosed in detail in U.S. Pat. No. 7,158,371, which is assigned to the assignee of the present invention. In such a swing-type communication terminal, a display unit on a swing housing is offset towards a side of a main housing after the swing housing swings 90°. It is inconvenient to view the display in this configuration.

As a result, in conventional mobile communication terminals such as those just described, it is convenient to input data and view displayed data, such as when operating in a phone mode like voice communication or when sending and receiving text messages. However, multimedia environments such as a Digital Multimedia Broadcasting (DMB) mode or a TV mode require a wide display unit. Thus, the display unit should be in a landscape view mode and should be positioned in the center of the mobile communication terminal.

Furthermore, in a game mode, the terminal should allow prompt and accurate key manipulation. The promptness and accuracy of key manipulation in the game mode are more important than in any other mode and key manipulation using both hands instead of one hand is one method for improving promptness and accuracy.

Although the foregoing problems can be solved by increasing the size of the mobile communication terminal, mounting a wide display unit in the mobile communication terminal, and disposing more keys in the mobile communication terminal, this solution goes against the trend toward miniaturization and causes inconvenience in carrying the mobile communication terminal. Moreover, mobile communication terminals in common use pursue slimness as well as miniaturization.

SUMMARY OF THE INVENTION

An aspect of the present invention is to address at least the above problems and/or disadvantages and to provide at least the advantages described below. Accordingly, an aspect of the present invention is to provide a swing-type mobile communication terminal that provides a convenient landscape view mode for a display unit and a swing device of the mobile communication terminal.

Moreover, another aspect of the present invention is to provide a swing-type mobile communication terminal in which an upper portion of a main body housing is completely covered with a display unit in a landscape view mode to allow a user to conveniently view data displayed on the display unit, and a swing device of the mobile communication terminal.

Another aspect of the present invention is to provide a swing-type mobile communication terminal, in which a stereo sound system is mounted at both sides of a display unit in a landscape view mode to radiate stereo sound while viewing moving pictures, and a swing device of the mobile communication terminal.

Another aspect of the present invention is to provide a swing-type mobile communication terminal that allows convenient viewing in modes associated with viewing moving pictures and a swing device of the mobile communication terminal.

Another aspect of the present invention is to provide a swing-type mobile communication terminal that is convenient to use in a Digital Multimedia Broadcasting (DMB) mode, a TV mode, or a game mode and a swing device of the mobile communication terminal.

Another aspect of the present invention is to provide a swing device having a simple structure.

Another aspect of the present invention is to provide a slim swing device.

In accordance with an aspect of the present invention, a swing-type mobile communication terminal is provided. The swing-type mobile communication terminal includes a main body housing having a plurality of first keys on its top face, a swing housing having a display unit on its top face, and a swing device for connecting the main body housing with the swing housing on the top face of the main body housing. The swing housing moves along a predetermined path while facing the main body housing so that it performs a first swing and a second swing successively after the first swing. After the first swing, the swing housing is positioned together with the main body housing in the shape of "┬" and covers an upper portion of the main body housing. After performing the second swing, the swing housing is positioned in the longitudinal direction of the main body housing.

In accordance with another aspect of the present invention, a swing-type mobile communication terminal is provided. The swing-type mobile communication terminal includes a first keypad unit, a display unit connected with the first keypad unit while facing the first keypad unit, and a swing device for swinging the display unit on the first keypad unit. The display unit is positioned together with the first keypad unit in the shape of "┬" and covers an upper portion of the first keypad unit after a first swing, and is positioned substantially parallel with the first keypad unit in a longitudinal direction of the first keypad unit after a second swing following the first swing. The display unit has a second keypad unit on its top face, and the first keypad unit and the second keypad unit are disposed at both sides of the display unit after the second swing.

In accordance with another aspect of the present invention, a swing device of a swing-type mobile communication terminal having a main body housing and a swing housing that swings from the main body housing is provided. The swing device includes a first member, a second member, a guide, and first and second connection units. The second member performs a first swing with a predetermined path on the first member while facing the first member to be positioned together with the first member in the shape of "┬", or the second member performs a second swing with a predetermined path to be positioned in the longitudinal direction of the first member. The guide is disposed on the second member and has a first guide unit and a second guide unit spaced apart from the first guide unit. The guide determines the swing of the second member. The first connection unit and the second connection unit engage the first guide unit and the second guide unit, respectively, to restrict the first member and the second member so that the first member and the second member can swing with respect to each other.

In accordance with another aspect of the present invention, a swing device of a swing-type mobile communication terminal having a main body housing and a swing housing that swings from the main body housing is provided. The swing device includes a first member, a second member, a guide, and a connection unit. The second member performs a first swing on the first member to be positioned together with the first member in the shape of "┬" and performs a second swing to be positioned in the longitudinal direction of the first member. The guide is disposed on the second member to guide the movement of the second member. The connection unit is connected with the guide unit to restrict the first member and the second member so that the first member and the second member can perform the first swing and the second swing with respect to each other.

In accordance with another aspect of the present invention, a swing device of a swing-type mobile communication terminal having a main body housing and a swing housing that swings from the main body housing is provided. The swing device includes a first member and a second member that performs a first swing and a second swing. The first swing of the second member is along a predetermined path on the first member while facing the first member so that the second member is positioned substantially perpendicular to the first member. The second swing positions the second member in the longitudinal direction of the first member. A guide includes a first guide unit formed in the first member and a second guide unit formed in the second member to guide the swing of the second member. A first connection unit and a second connection unit engage the first guide unit and the second guide unit, respectively to restrict the first member and the second member so that the first member and the second member can swing with respect to each other.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

Figure 1:
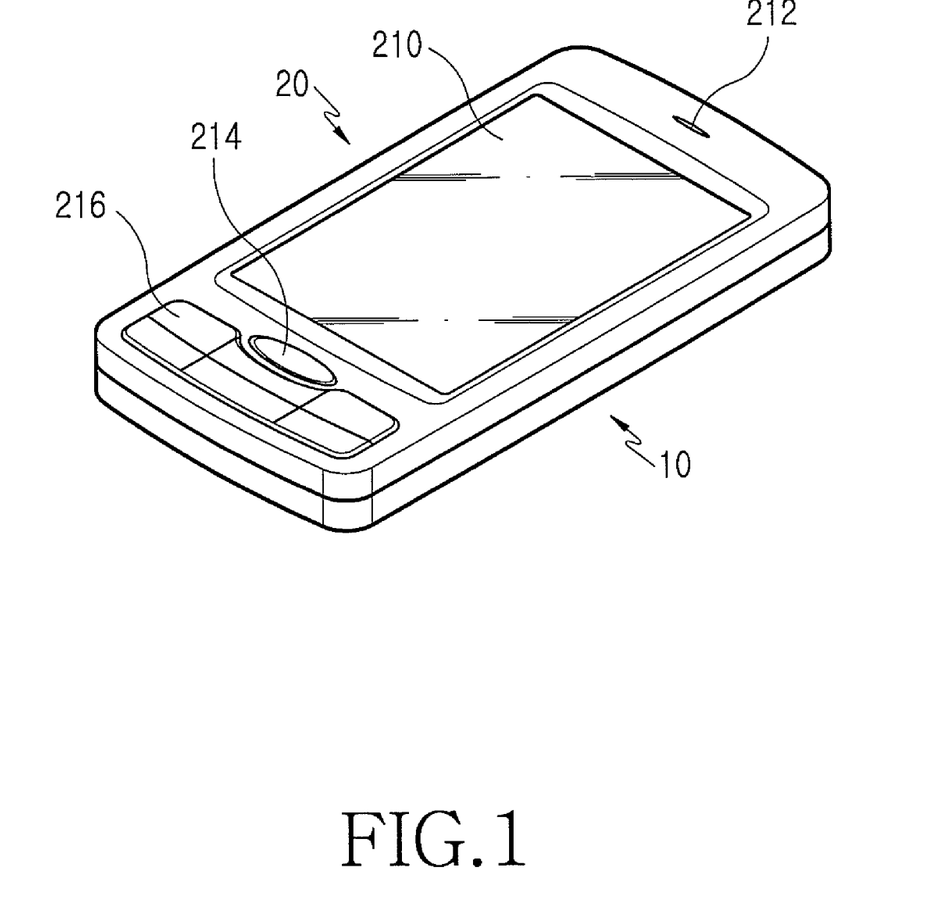
FIG. 1 is a perspective view of a mobile communication terminal according to an exemplary embodiment of the present invention.
Figure 2:
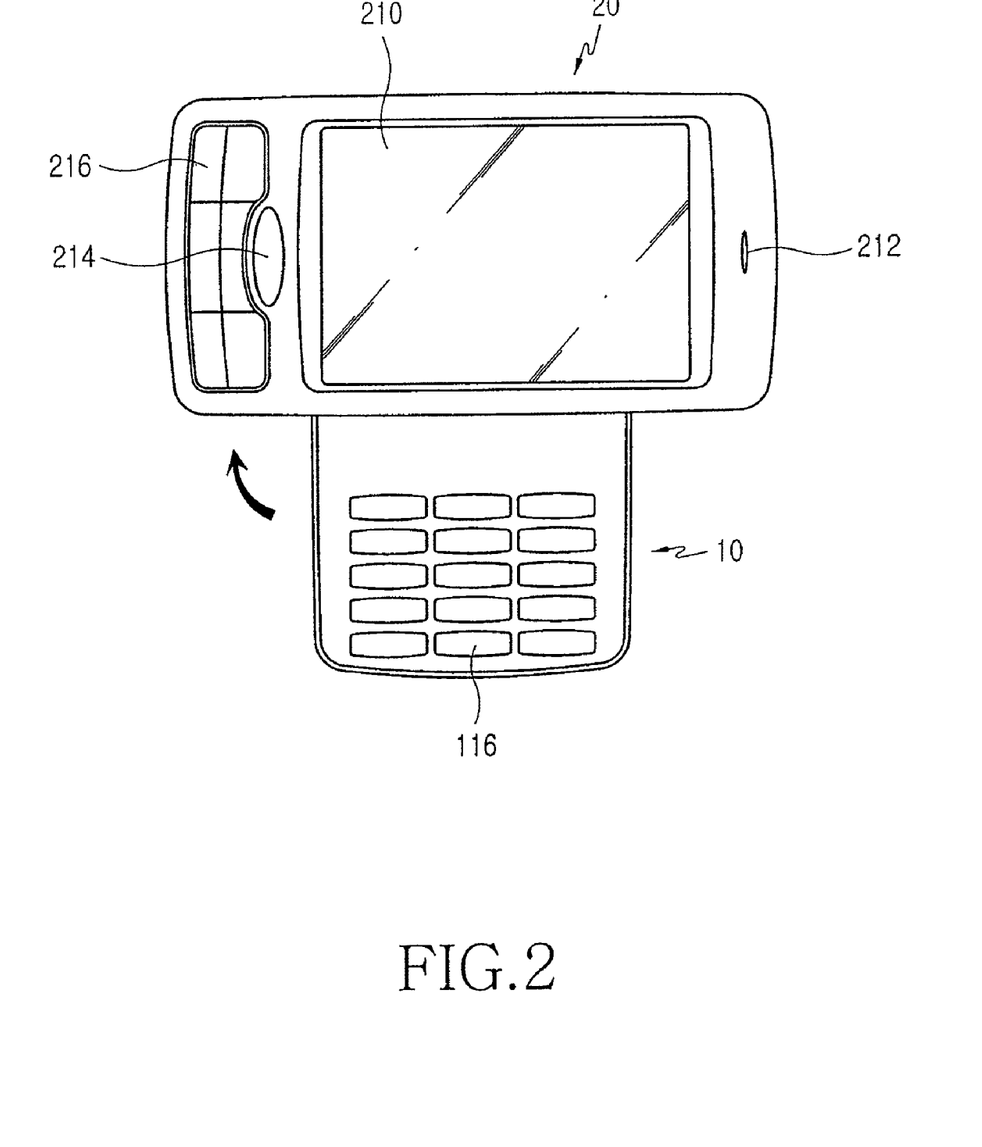
FIG. 2 is a plan view of the mobile communication terminal illustrated in FIG. 1, with a swing housing rotated 90°.
Figure 3:
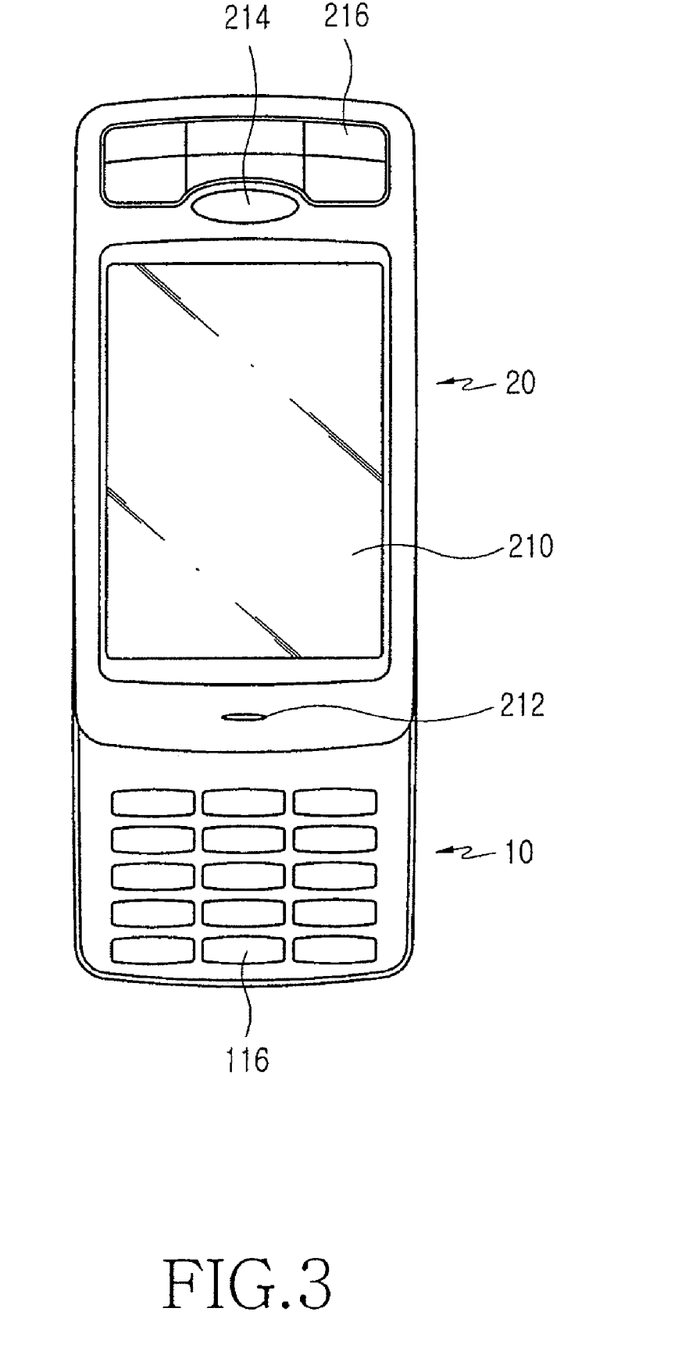
FIG. 3 is a plan view of the mobile communication terminal illustrated in FIG. 1 with the swing housing rotated 180°.

The structure of a mobile communication terminal according to an exemplary embodiment of the present invention will be described with reference to FIGS. 1 through 3. As illustrated in FIGS. 1 through 3, the mobile communication terminal according to an exemplary embodiment of the present invention is a swing type terminal and includes a main body housing 10, a swing housing 20, and a swing device 30 (see FIG. 4) for swinging the swing housing 20 with respect to the main body housing 10. In the illustrated embodiment, the swing housing 30 is driven manually.

As illustrated in FIG. 2, the swing housing 20 performs a first swing along a predetermined path while facing the main body housing 10, thus completely covering an upper portion of the main body housing 10 and being positioned, together with the main body housing 10, in the shape of "⊤". As illustrated in FIG. 3, the swing housing 20 further performs a second swing after performing the first swing, thus being positioned in the longitudinal direction of the main body housing 10. After the second swing, the swing housing 20 is upside-down.

The main body housing 10 includes a first keypad unit with a plurality of first keys 116 on its top face. The first keys 116 are arranged in a lower portion of the top face of the main body housing 10. The swing device 30 (which is described in detail later) is disposed at an upper portion of the top face of the main body housing 10. That is, on the top face of the main body housing 10, an area where the first keys 116 are disposed is the lower portion and an area where the first keys 116 are not disposed and the swing device 30 is disposed is the upper portion. As illustrated in FIGS. 1 through 3, the upper portion of the top face of the main body housing 10 is closed at all times. On the other hand, the lower portion of the top face of the main body housing 10 can be opened as illustrated in FIGS. 2 and 3.

A display unit 210 is disposed on the top face of the swing housing 20. At least one set of speaker devices 212 and 214 and a second keypad unit with a plurality of second keys 216 are also disposed on the top face of the swing housing 20. The set of speaker devices 212 and 214 include a first speaker device 212 and a second speaker device 214 that are disposed at both sides of the display unit 210 to radiate stereo sound. The position of the display unit 210 before the first swing as illustrated in FIG. 1 is referred to as a 'portrait view' state. The position of the display unit 210 after the first swing as illustrated in FIG. 2 is referred to as a 'landscape view' mode. It is convenient for a user to watch moving pictures with the display unit 210 in the landscape view mode as illustrated in FIG. 2.

The swing housing 20 is rotated about 90° clockwise in the position illustrated in FIG. 2, and the swing housing 20 is rotated about 180° clockwise in the position illustrated in FIG. 3. The swing by about 90° is the first swing and the swing by about another 90° after the first swing, i.e., the swing by about 180°, is the second swing. After the second swing, the swing housing 20 is disposed upside down in the longitudinal direction of the main body housing 10.

The display unit 210 in the landscape view mode illustrated in FIG. 2 allows convenient viewing of moving pictures.

Since the first keypad unit including the first keys 116 and the second keypad unit including the second keys 216 are disposed at both sides of the display unit 210 in the portrait view mode illustrated in FIG. 3, the user can conveniently perform key manipulation using both hands while viewing the display unit 210 in a game mode.

The structure of the swing device 30 according to a first exemplary embodiment of the present invention will now be described with reference to FIGS. 4 through 7. As illustrated in FIGS. 4 through 7, the swing device 30 includes a first member 31 engaged with the main body housing (10 of FIG. 1), a second member 32 engaged with the swing housing (20 of FIG. 1), a guide to guide the movement of the second member 32, and an engagement unit for holding the first member 31 and the second member 32 together while facing each other. The second member 32 swings along a predetermined path on the first member 31 while facing the first member 31.

The first member 31 of the swing device 30 according to the first exemplary embodiment of the present invention may be formed by the top face of the main body housing 10 and the second member 32 of the swing housing 30 may be formed by the bottom face of the sliding housing 20. In other words, the first member 31 may be separately manufactured and fastened to the top face of the main body housing 10 by a fastener (not illustrated), or it may be formed by the top face of the main body housing 10. Similarly, the second member 32 may be separately manufactured and fastened to the bottom face of the sliding housing 20 by a fastener (not illustrated), or it may be formed by the bottom face of the sliding housing 20.

The guide includes a first guide unit 320 and a second guide unit 330. The engagement unit includes a first connection unit 310 that engages the first guide unit 320 and a second connection unit 312 that engages the second guide unit 330.

Figure 5:
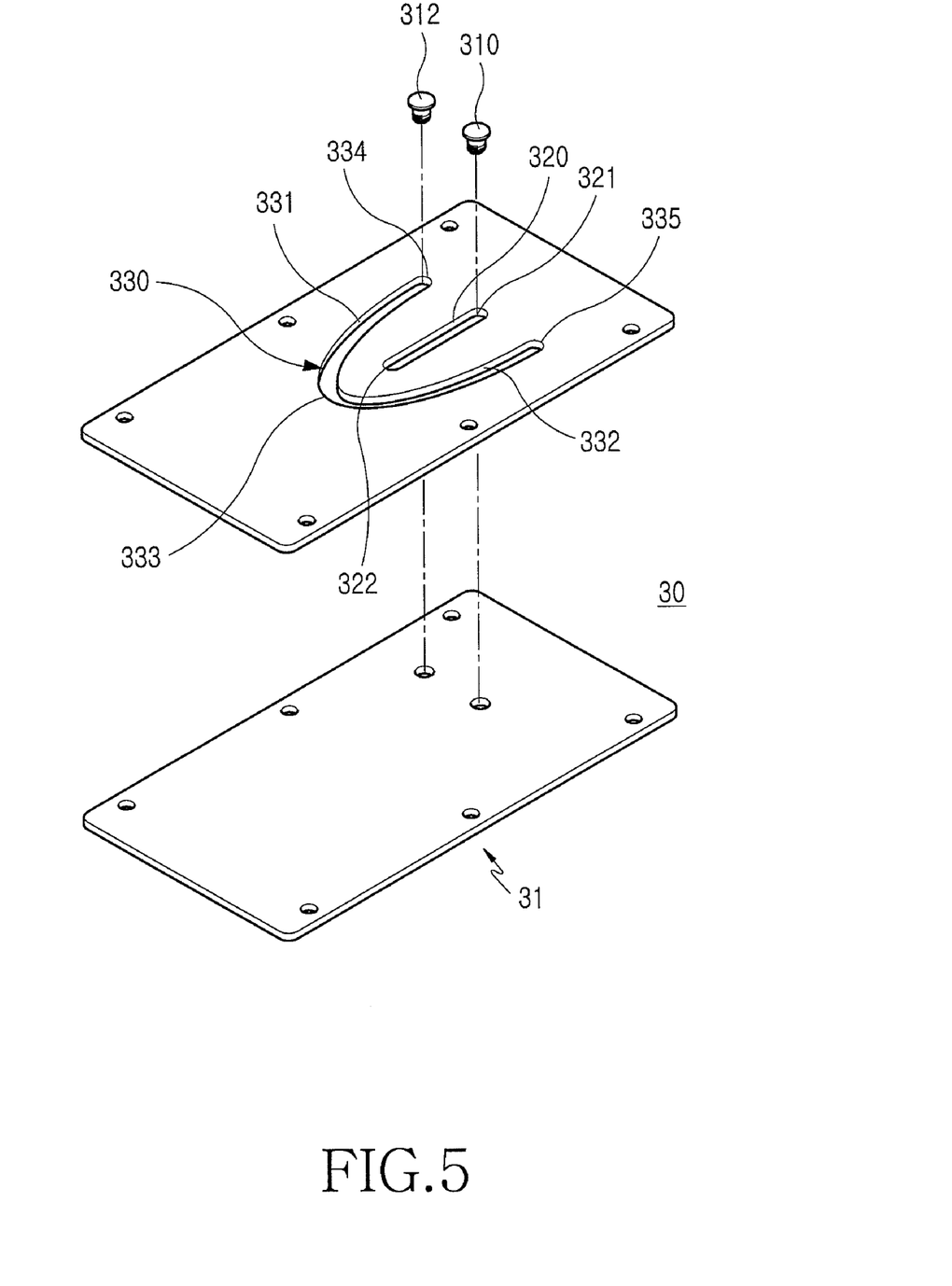
FIG. 5 is an exploded perspective view of the swing device illustrated in FIG. 4.

As illustrated in FIG. 5, the guide includes the first guide unit 320 and the second guide unit 330 that is spaced apart from the first guide unit 320 on the second member 32 to guide the movement of the second member 32. The first guide unit 320 is substantially linear and the second guide unit 330 is curved. The first guide unit 320 and the second guide unit 330 are formed as openings, and thus the first connection unit 310 and the second connection unit 312 engage the first guide unit 320 and the second guide unit 330 by passing through the first guide unit 320 and the second guide unit 330, respectively. The first guide unit 320 is shaped like an 'I' and the second guide unit 330 is shaped like a 'C'. The first guide unit 320 is disposed in a space formed by the shape of the second guide unit 330. In particular, the second guide unit 330 forms a 'C' shape with an open top. The first guide unit 320 extends in the longitudinal direction of the main body housing (10 of FIG. 1).

The second guide unit 330 includes a first curved guide unit 331 for the first swing and a second curved guide unit 332 for the second swing. The first curved guide unit 331 and the second curved guide unit 332 are substantially symmetrical with respect to each other. The first curved guide unit 331 and the second curved guide unit 332 are gently curved. The second guide unit 330 includes a curve point 333 between the first curved guide unit 331 and the second curved guide unit 332.

Figure 4:
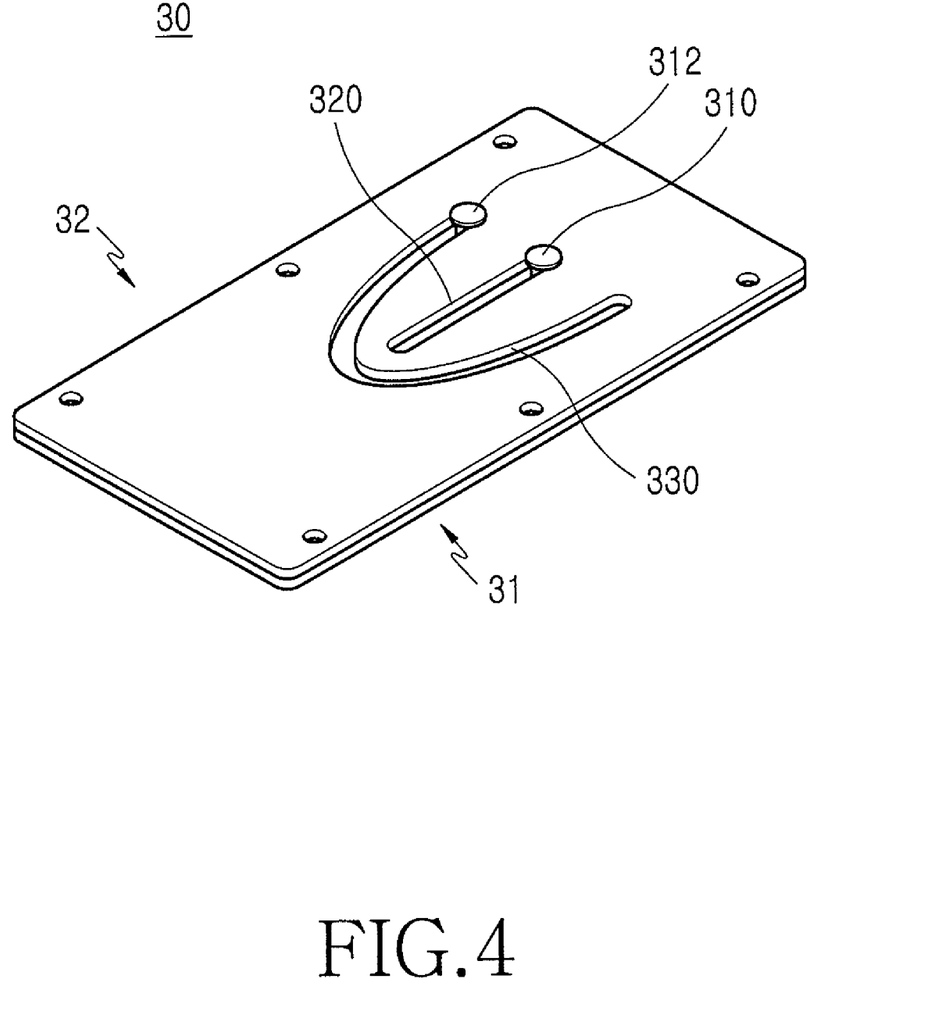
FIG. 4 is a perspective view of a swing device used in a mobile communication terminal according to a first exemplary embodiment of the present invention.

As illustrated in FIGS. 4 and 5, before the first swing, the first connection unit 310 is positioned at a first end 321 of the first guide unit 320 and the second connection unit 312 is positioned at a first end 334 of the first curved guide unit 331.

Figure 6:
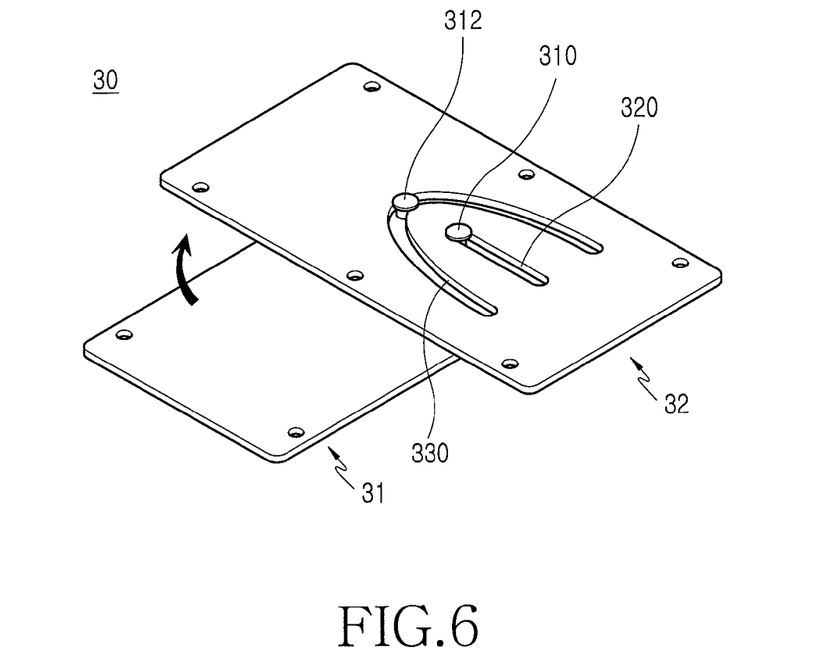
FIG. 6 is a perspective view of the swing device illustrated in FIG. 4 with a second member rotated 90°.

As illustrated in FIGS. 4 and 6, after the first swing, the first connection unit 310 is positioned at a second end 322 of the first guide unit 320 and the second connection unit 312 is positioned at the curve point 333 of the second guide unit 330.

Figure 7:
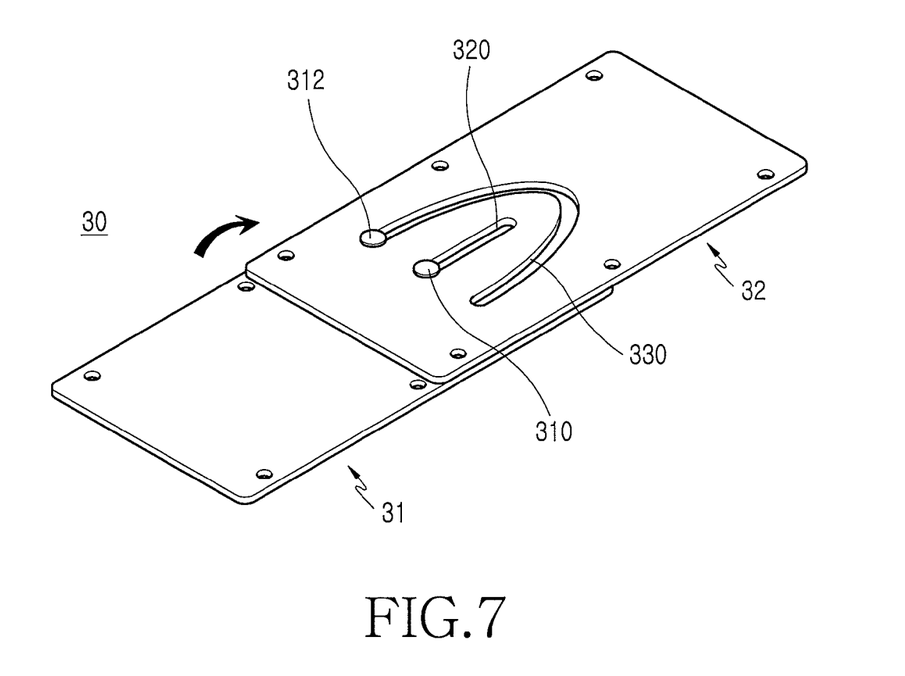
FIG. 7 is a perspective view of the swing device illustrated in FIG. 4 with the second member rotated 180°.

As illustrated in FIGS. 4 and 7, after the second swing, the first connection unit 310 is positioned at the first end 321 of the first guide unit 320 and the second connection unit 312 is positioned at a second end 335 of the second curved guide unit 332.

The first connection unit 310 and the second connection unit 312 are protrusions and are disposed at predetermined positions of the first member 31. In particular, the first connection unit 310 and the second connection unit 312 engage the first guide unit 320 and the second guide unit 330 by passing through the first guide unit 320 and the second guide unit 330 to allow the second member 32 to rotate. At the same time, the first connection unit 310 and the second connection unit 312 restrict the movement of the second member 32 so that it faces the first member 31.

The first guide unit 320 and the second guide unit 330 are vertically asymmetric and horizontally symmetric to each other. The first connection unit 310 and the second connection unit 312 are vertically and horizontally asymmetric to each other.

If the user swings the second member 32 about 90° counterclockwise, i.e., performs the first swing, in the state illustrated in FIG. 4, the first connection unit 310 and the second connection unit 312 move along the first guide unit 320 and the second guide unit 330 to the position illustrated in FIG. 6. The first connection unit 310 moves from the first end 321 of the first guide unit 320 to the second end 322 of the first guide unit 320 and the second connection unit 312 moves from the first end 334 of the second guide unit 330 to the curve point 333 of the second guide unit 330. If the user then swings the second member 32 about 180° counterclockwise, i.e., performs the second swing, the first connection unit 310 and the second connection unit 312 move along the first guide unit 320 and the second guide unit 330 to the position illustrated in FIG. 7. The first connection unit 310 moves from the second end 322 of the first guide unit 320 to the first end 321 of the first guide unit 320 and the second connection unit 312 moves from the curve point 333 of the second guide unit 330 to the first end 335 of the second guide unit 330.

For reference, the position of the swing device illustrated in FIG. 4 corresponds to the position of the mobile terminal illustrated in FIG. 1, the position of the swing device illustrated in FIG. 6 corresponds to the position of the mobile terminal illustrated in FIG. 2, and the position of the swing device illustrated in FIG. 7 corresponds to the position of the mobile terminal illustrated in FIG. 3.

The structure of a swing device 40 according to a second exemplary embodiment of the present invention will now be described with reference to FIGS. 8 through 13. As illustrated in FIGS. 8 through 13, the swing device 40 includes a first member 41 engaged with the main body housing (10 of FIG. 1), a second member 42 engaged with the swing housing (20 of FIG. 1), a guide to guide the movement of the second member 42, and an engagement unit for holding the first member 41 and the second member 42 together while facing each other. The second member 42 swings along a predetermined path on the first member 41 while facing the first member 41.

The first member 41 of the swing device 40 according to the second exemplary embodiment of the present invention may be formed by the top face of the main body housing 10 and the second member 42 of the swing housing 40 may be formed by the bottom face of the sliding housing 20. In other words, the first member 41 may be separately manufactured and fastened to the top face of the main body housing 10 by a fastener (not illustrated), or it may be formed by the top face of the main body housing 10. Similarly, the second member 42 may be separately manufactured and fastened to the bottom face of the sliding housing 20 by a fastener (not illustrated), or it may be formed by the bottom face of the sliding housing 20.

The guide includes a first guide unit 410 and a second guide unit 420. The engagement unit includes a first connection unit 43 that engages the first guide unit 410 and a second connection unit 44 that engages the second guide unit 420.

Figure 9:
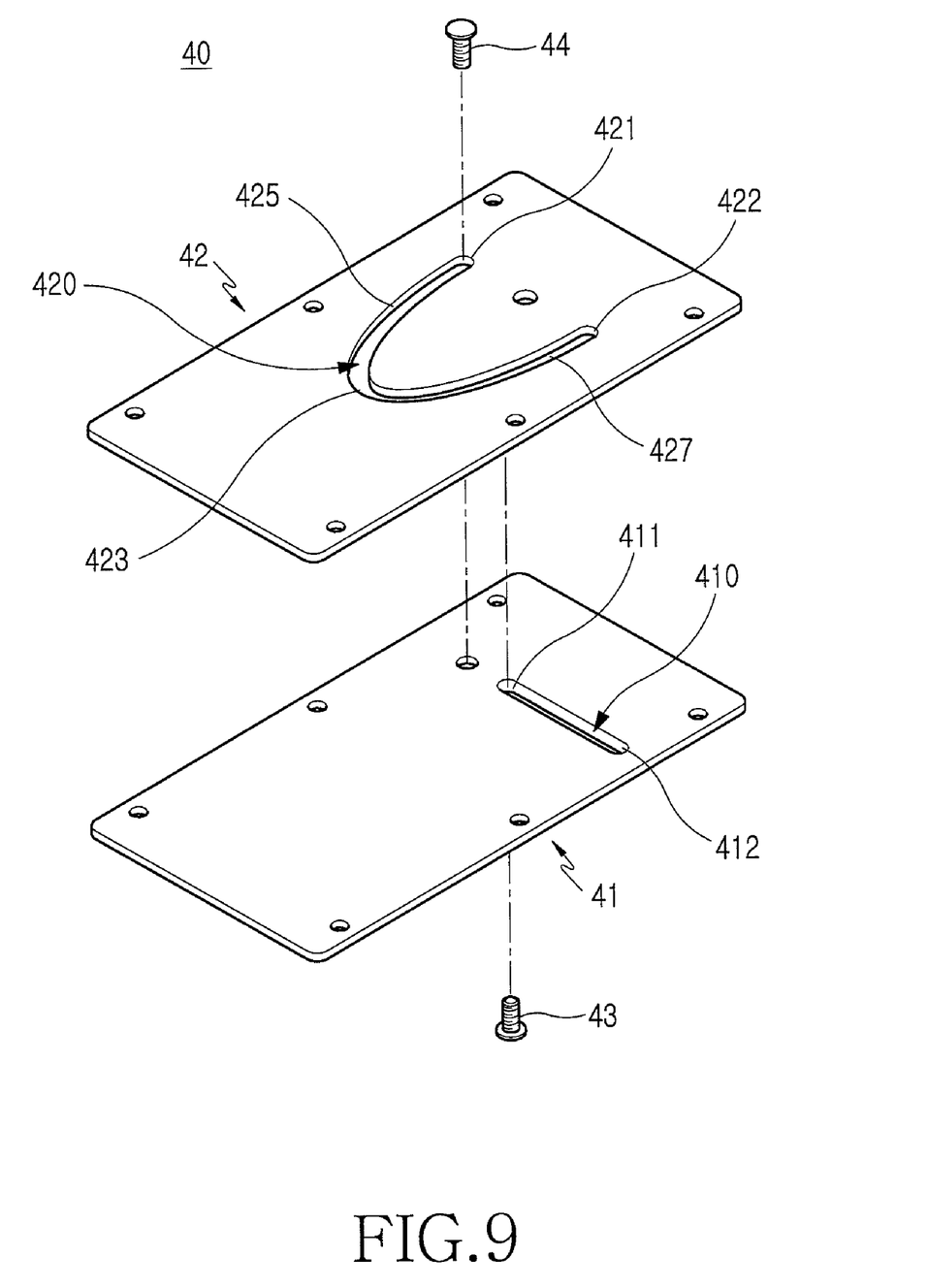
FIG. 9 is an exploded perspective view of the swing device illustrated in FIG. 8.

As illustrated in FIG. 9, the guide includes the first guide unit 410 and the second guide unit 420 that is spaced apart from the first guide unit 410 on the second member 44 to guide the movement of the second member 44. The first guide unit 410 is substantially linear and the second guide unit 420 is curved. The first guide unit 410 and the second guide unit 420 are formed as openings, and thus the first connection unit 43 and the second connection unit 44 engage the first guide unit 410 and the second guide unit 420 by passing through the first guide unit 410 and the second guide unit 420, respectively. The first guide unit 410 is shaped like an 'I' and the second guide unit 420 is shaped like a 'C'. In particular, the second guide unit 420 forms a 'C' shape with an open top. The first guide unit 410 extends substantially perpendicularly to the longitudinal direction of the main body housing (10 of FIG. 1).

The second guide unit 420 includes a first curved guide unit 425 for the first swing and a second curved guide unit 427 for the second swing. The first curved guide unit 425 and the second curved guide unit 427 are substantially horizontally symmetrical with respect to each other. The first curved guide unit 425 and the second curved guide unit 427 are gently curved. The second guide unit 420 includes a curve point 423 between the first curved guide unit 425 and the second curved guide unit 427.

Figure 8:
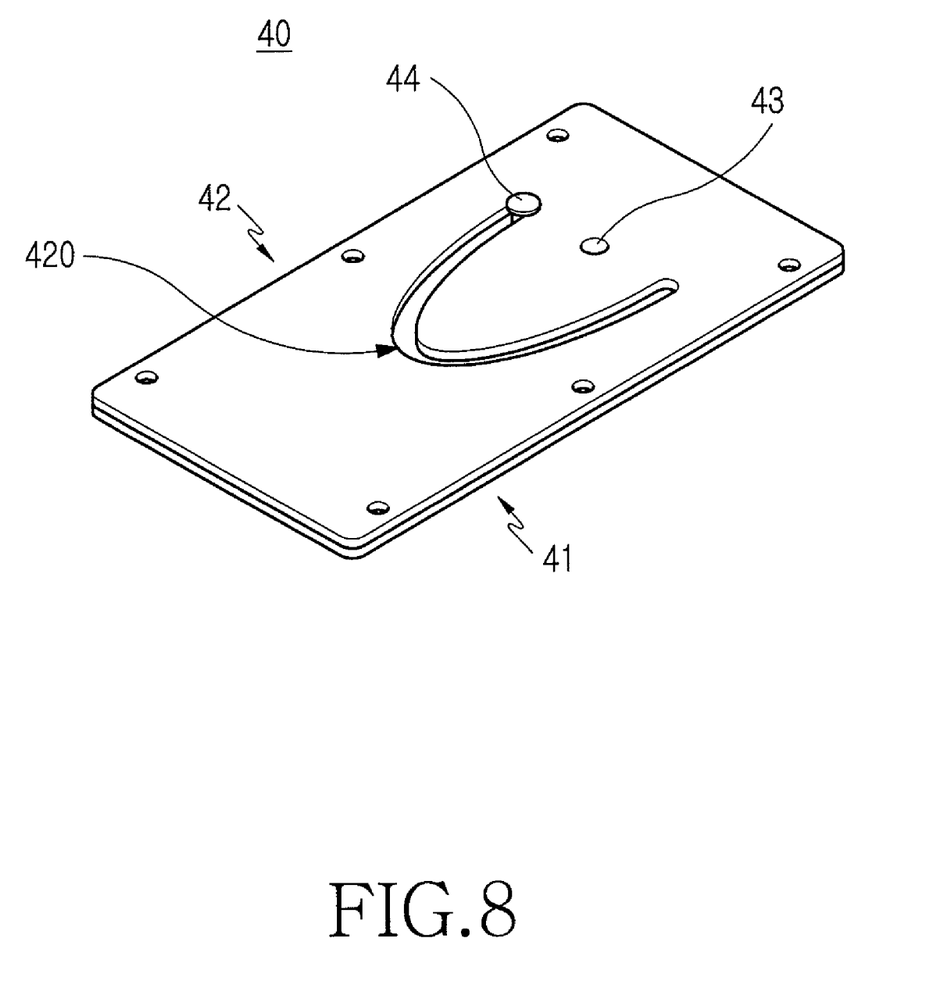
FIG. 8 is a perspective view of a swing device used in a mobile communication terminal according to a second exemplary embodiment of the present invention.

As illustrated in FIGS. 8 and 9, before the first swing, the first connection unit 43 is positioned at a first end 411 of the first guide unit 410 and the second connection unit 44 is positioned at a first end 421 of the second guide unit 420.

Figure 10:
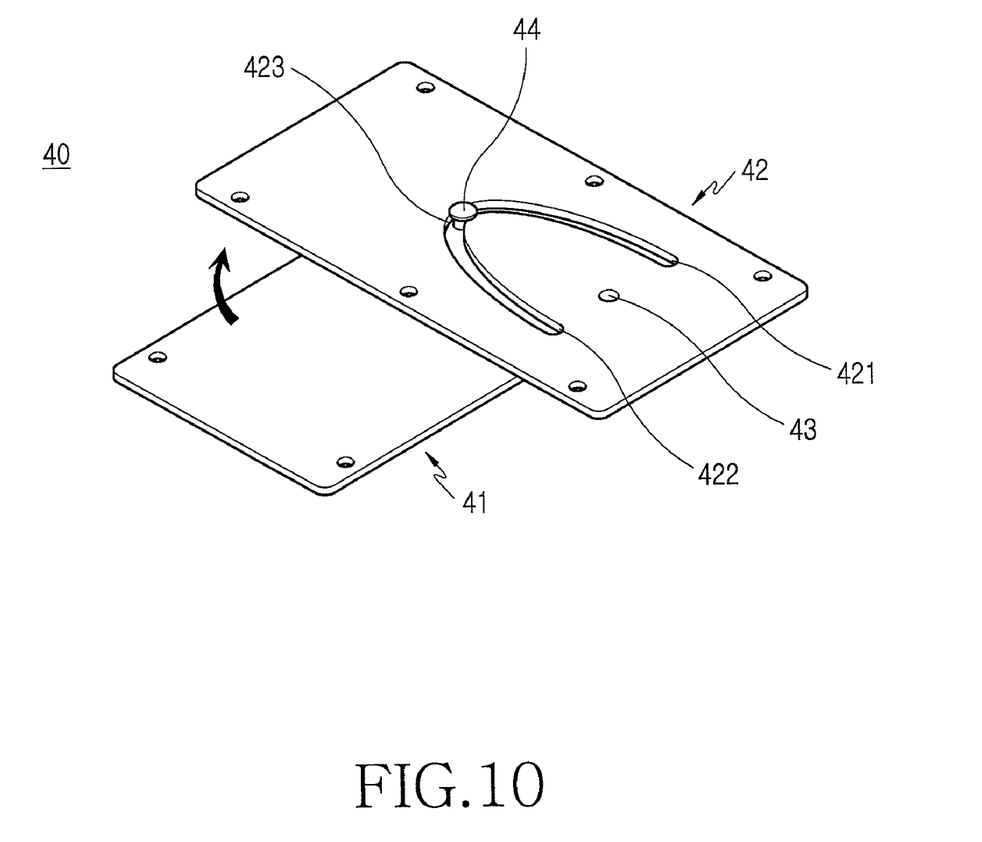
FIG. 10 is a perspective view of the swing device illustrated in FIG. 8 with a second member rotated 90°.
Figure 11:
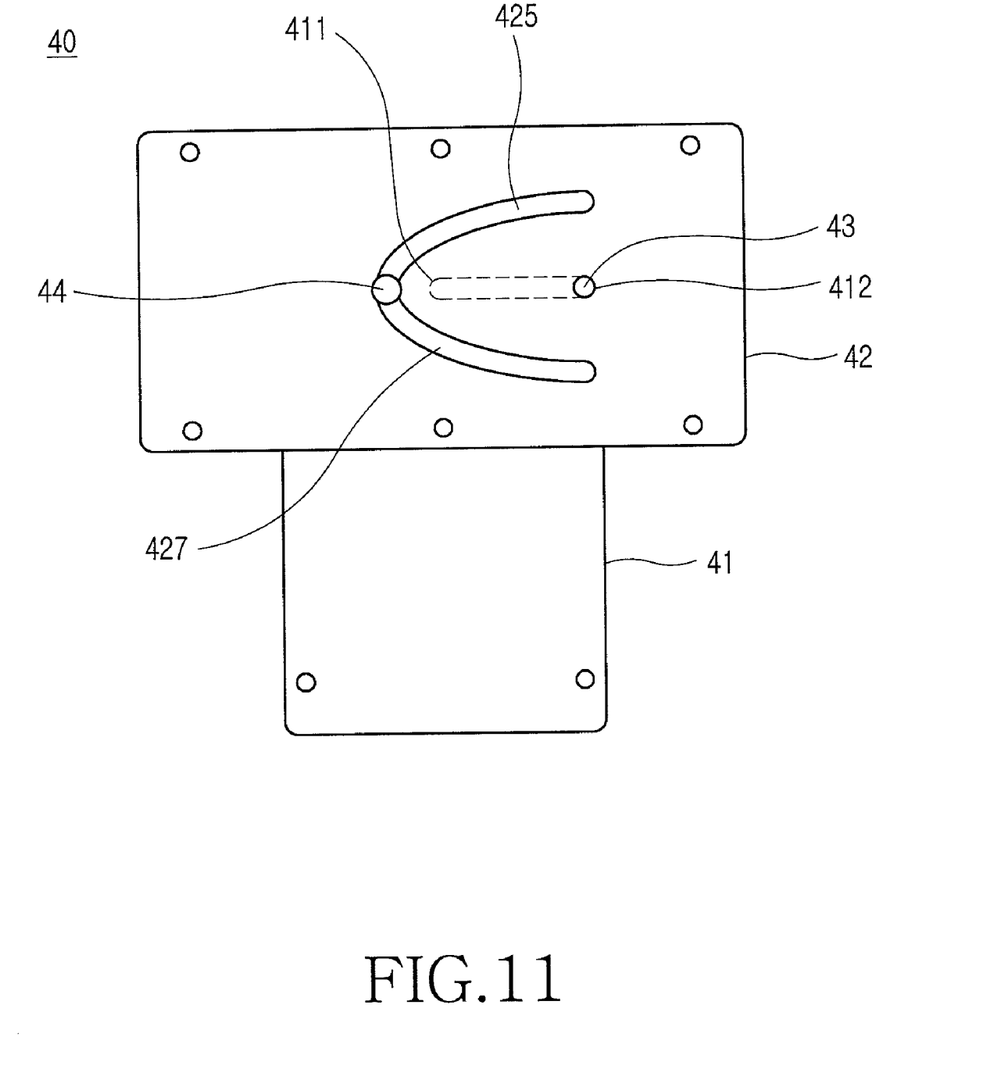
FIG. 11 is a plan view of the swing device illustrated in FIG. 10.

As illustrated in FIGS. 9 through 11, after the first swing, the first connection unit 43 is positioned at a second end 412 of the first guide unit 410 and the second connection unit 44 is positioned at the curve point 423 of the second guide unit 420.

Figure 12:
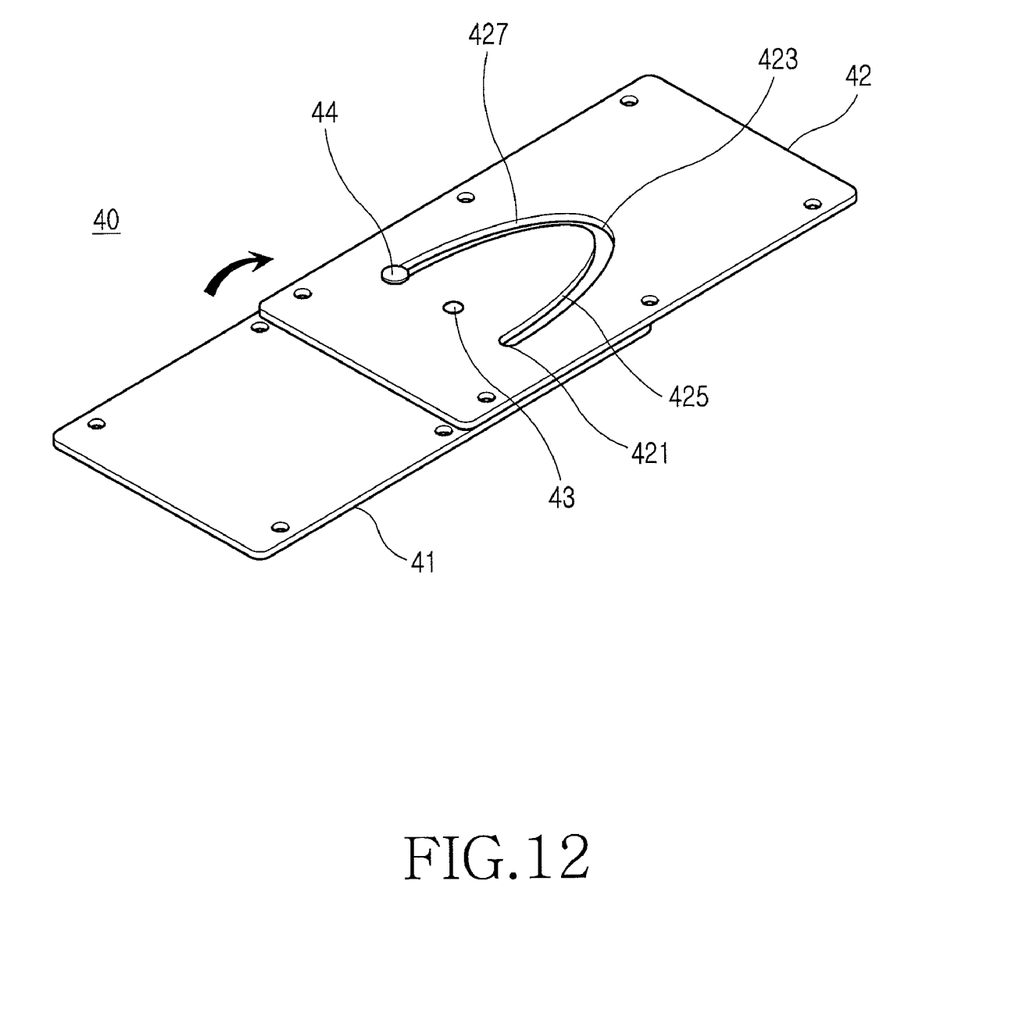
FIG. 12 is a perspective view of the swing device illustrated in FIG. 8 with the second member rotated 180°.
Figure 13:
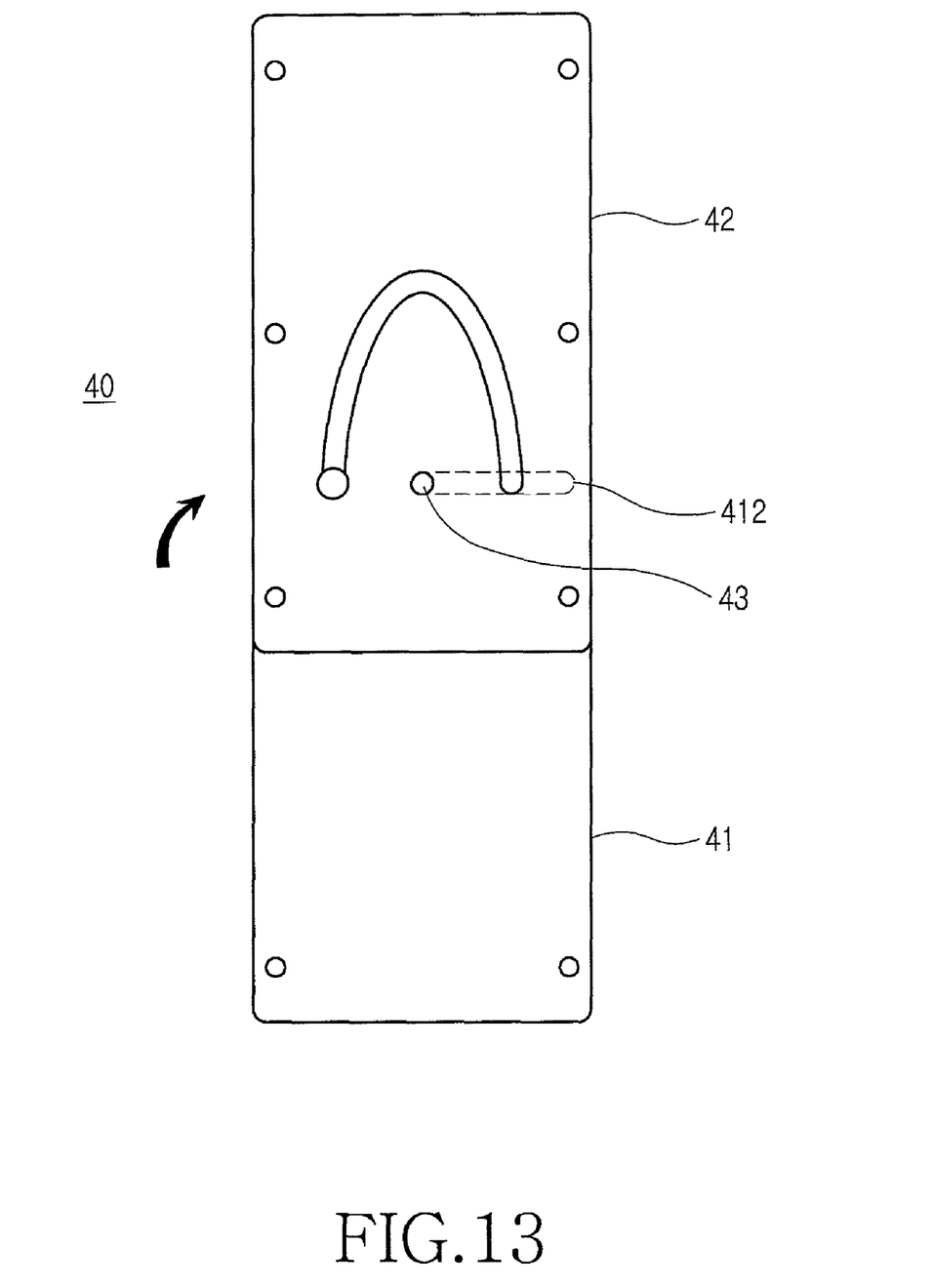
FIG. 13 is a plan view of the swing device illustrated in FIG. 12.

As illustrated in FIGS. 9, 12, and 13, after the second swing, the first connection unit 43 is positioned at the first end 411 of the first guide unit 410 and the second connection unit 44 is positioned at a second end 422 of the second guide unit 420.

The first connection unit 43 and the second connection unit 44 are protrusions and are disposed in predetermined positions of the first member 41 and the second member 42. In particular, the first connection unit 43 and the second connection unit 44 engage the first guide unit 410 and the second guide unit 420 by passing through the first guide unit 410 and the second guide unit 420 to allow the second member 42 to swing. The second member 42 faces the first member 41 and is held against the first member 41 by the first connection unit 43 and the second connection unit 44.

If the user swings the second member 42 about 90° clockwise with a predetermined path, i.e., performs the first swing, in a state as illustrated in FIG. 8, the first connection unit 43 and the second connection unit 44 move along the first guide unit 410 and the second guide unit 420 as illustrated in FIG. 10. The first connection unit 43 moves to the second end 412 of the first guide unit 410 from the first end 411 of the first guide unit 410 and the second connection unit 44 moves to the curve point 423 of the second guide unit 420 from the first end 421 of the second guide unit 420.

If the user then swings the second member 42 about 180° clockwise, i.e., performs the second swing, the first connection unit 43 and the second connection unit 44 move along the first guide unit 410 and the second guide unit 420 as illustrated in FIG. 12. The first connection unit 43 moves from the second end 412 of the first guide unit 410 to the first end 411 of the first guide unit 410, and the second connection unit 44 moves from the curve point 423 of the second guide unit 420 to the second end 422 of the second guide unit 420.

For reference, the position of the swing device illustrated in FIG. 8 corresponds to the position of the mobile terminal illustrated in FIG. 1, the position of the swing device illustrated in FIGS. 10 and 11 correspond to the position of the mobile terminal illustrated in FIG. 2, and the position of the swing device illustrated in FIGS. 12 and 13 corresponds to the position of the mobile terminal illustrated in FIG. 3.

In the above description, the mobile terminal is rotated by manual force. The swing device according to the present invention is not limited to manual force, however, and a semi-automatic or automatic force may be used to rotate the portable terminal. For example, the swing device according to the present invention may be driven semi-automatically by employing an elastic member, as is well-known to those skilled in the relevant art. Similarly, the swing device according to the present invention may be driven automatically by incorporating a motor, a motor retardation unit, a motor controller and the like, as is well-known to those skilled in the relevant art.

As described above, according to the exemplary embodiments of the present invention, a display unit is positioned in the center of a main body housing while completely covering an upper portion of the main body housing, thereby allowing a user to conveniently view data displayed on the display unit and providing stereo sound from both sides of the display unit to improve the quality of viewing moving pictures. Moreover, the swing device according to the exemplary embodiments of the present invention contributes to cost reduction with its simple structure and also contributes to a reduced thickness (i.e., slimness) of the mobile communication terminal with its slim structure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A swing-type mobile communication terminal comprising:
   a main body housing having a plurality of first keys on its top face;
   a swing housing having a display unit on its top face, the swing housing performing a first swing along a predetermined curved path to be positioned together with the main body housing in the shape of a "┬" by covering an upper portion of the top face of the main body housing, and performing a second swing along a predetermined curved path successively from the first swing in a same swing direction as the first swing to be positioned in a longitudinal direction of the main body housing and to cover less than the entire top face of the main body housing; and
   a swing device to connect the main body housing with the swing housing on the top face of the main body housing,
   wherein, prior to performing the first swing, the swing housing is positioned together with the main body housing in the longitudinal direction of the main body housing and covers the entire top face of the main body housing, and
   wherein the swing device includes a linear first guide opening and a curved second guide opening, the swing device further including a first connection unit and a second connection unit that engage with the first guide opening and the second guide opening by passing through the first guide opening and the second guide opening, respectively.

2. The swing-type mobile communication terminal of claim 1, further comprising:
   a plurality of second keys on the top face of the swing housing; and
   first and second speaker devices disposed at both sides of the display unit.

3. The swing-type mobile communication terminal of claim 2, wherein the first key and second keys are disposed at both sides of the display unit after the second swing.

4. The swing-type mobile communication terminal of claim 1, wherein the display unit is in a landscape view mode after the first swing.

5. A swing-type mobile communication terminal comprising:
   a first housing including a first keypad unit on its top face;
   a second housing including a display unit and a second keypad unit on its top face, wherein, after a first swing along a predetermined curved path, the first keypad unit and the display unit form a "┬" shape and an upper portion of the top face of the first housing is covered, and, after a second swing along a predetermined curved path successively from the first swing in a same swing direction as the first swing, the second housing is positioned in a longitudinal direction of the first housing and covers less than the entire top face of the first housing so that the first keypad unit is not covered by the second housing and the first keypad unit and the second keypad unit are disposed at both sides of the display unit; and
   a swing device for swinging the display unit on the first keypad unit,
   wherein, prior to performing the first swing, the second housing is positioned together with the first housing in the longitudinal direction of the first housing and covers the entire top face of the first housing so that the first keypad unit is covered by the second housing, and
   wherein the swing device includes a linear first guide opening and a curved second guide opening, the swing device further including a first connection unit and a second connection unit that engage with the first guide opening and the second guide opening by passing through the first guide opening and the second guide opening, respectively.

6. The swing-type mobile communication terminal of claim 5, wherein the display unit is in a landscape view mode with respect to the first keypad unit after the first swing and is upside-down on the first keypad unit after the second swing.

7. A swing device of a swing-type mobile communication terminal, comprising a main body housing and a swing housing that swings from the main body housing, the swing device comprising:
   a first member;
   a second member performing a first swing with a predetermined curved path on the first member to be positioned together with the first member in a "┬" shape by covering an upper portion of a top face of the first member, and performing a second swing with a predetermined curved path successively from the first swing in a same swing direction as the first swing to be positioned in a longitudinal direction of the first member and cover less than the entire top face of the first member;

a guide comprising a first guide unit on the second member and a second guide unit on the second member spaced apart from the first guide unit to guide the swing of the second member; and a first connection unit and a second connection unit connected with the first guide unit and the second guide unit, respectively, to guide the first member and the second member so that the first member and the second member can swing with respect to each other, wherein, prior to performing the first swing, the second member is positioned together with the first member in the longitudinal direction of the first member and covers the entire top face of the first member, and wherein the first guide unit is linear, the second guide unit is curved, the first guide unit and the second guide unit are openings, and the first connection unit and the second connection unit engage the first guide unit and the second guide unit by passing through the first guide unit and the second guide unit, respectively.

8. The swing device of claim 7, wherein the first guide unit comprises an 'I' shape, the second guide unit comprises a 'C' shape with an opened top, and the first guide unit is disposed in a space formed by the second guide unit.

9. The swing device of claim 7, wherein the second guide unit comprises:
a first curved guide unit for the first swing;
a second curved guide unit for the second swing; and
a curve point between the first curved guide unit and the second curved guide unit,
wherein the first curved guide unit and the second curved guide unit are substantially symmetrical to each other.

10. The swing device of claim 9,
wherein the first connection unit is positioned at a first end of the first guide unit and the second connection unit is positioned at a first end of the second curved guide unit before the first swing,
wherein the first connection unit is positioned at a second end of the first guide unit and the second connection unit is positioned at the curve point of the second guide unit after the first swing, and
wherein the first connection unit is positioned at the first end of the first guide unit and the second connection unit is positioned at a second end of the second curved guide unit after the second swing.

11. The swing device of claim 7, wherein the first guide unit and the second guide unit are vertically asymmetric and horizontally symmetric with respect to each other.

12. The swing device of claim 7, wherein the first connection unit and the second connection unit are vertically and horizontally asymmetric with respect to each other.

13. The swing device of claim 7, wherein the first member is formed by a top face of the main body housing and the second member is formed by a bottom face of the swing housing.

14. The swing device of claim 7, wherein the first guide unit extends in the longitudinal direction of the main body housing.

15. A swing device of a swing-type mobile communication terminal comprising a main body housing and a swing housing that swings from the main body housing, the swing device comprising:
a first member;
a second member performing a first swing along a predetermined curved path on the first member to be positioned together with the first member in a "T" shape by covering an upper portion of a top face of the first member, and performing a second swing along a predetermined curved path successively from the first swing in a same swing direction as the first swing to be positioned in a longitudinal direction of the first member and cover less than the entire top face of the first member;
a linear first guide opening and a curved second guide opening on the second member to guide the movement of the second member; and
a first connection unit and a second connection unit engaging the first guide opening and the second guide opening by passing through the first guide opening and the second guide opening, respectively, to restrict the first member and the second member so that the first member and the second member can perform the first swing and the second swing with respect to each other,
wherein, prior to performing the first swing, the second member is positioned together with the first member in the longitudinal direction of the first member and covers the entire top face of the first member.

16. The swing device of claim 15, wherein the first guide opening comprises an 'I' shape, the second guide opening comprises a 'C' shape, the first and second guide openings being horizontally symmetrical to each other.

17. The swing device of claim 16, wherein the first guide opening extends in a longitudinal direction of the first member.

18. The swing device of claim 15, wherein the first member is fastened to a top face of the main body housing by a fastener and the second member is fastened to a bottom face of the swing housing.

19. The swing device of claim 15, wherein the first member is formed by a top face of the main body and the second member is formed by a bottom face of the swing housing.

20. The swing device of claim 19,
wherein the first connection unit is positioned at a first end of the first guide opening and the second connection unit is positioned at a first end of the second guide opening before the first swing,
wherein the first connection unit is positioned at a second end of the first guide opening and the second connection unit is positioned at a curve point of the second guide opening after the first swing, and
wherein the first connection unit is positioned at the first end of the first guide unit and the second connection unit is positioned at a second end of the second curved guide opening after the second swing.

21. A swing device of a swing-type mobile communication terminal comprising a main body housing and a swing housing that swings from the main body housing, the swing device comprising:
a first member;
a second member performing a first swing along a predetermined curved path on the first member to be positioned substantially perpendicular to the first member by covering an upper portion of a top face of the first member, and performing a second swing along a predetermined curved path successively from the first swing in a same swing direction as the first swing to be positioned in a longitudinal direction of the first member and cover less than the entire top face of the first member;
a guide comprising a first guide unit on the first member and a second guide unit on the second member to guide the swing of the second member; and a first connection unit and a second connection unit engaging the first guide unit and the second guide unit, respectively, to restrict the first member and the second member so that the first member and the second member can swing with respect to each other, wherein, prior to performing the first swing, the second member is positioned together with the first member in the longitudinal direction of the first member and covers the entire top face of the first member, and wherein the first guide unit is linear, the second guide unit is curved, the first guide unit and the second guide unit are openings, and the first connection unit and the second connection unit engage the first guide unit and the second guide unit by passing through the first guide unit and the second guide unit, respectively.

22. The swing device of claim 21, wherein the second guide unit comprises:

a first curved guide unit to guide the first swing;

a second curved guide unit to guide the second swing; and a curve point between the first curved guide unit and the second curved guide unit, wherein the first curved guide unit and the second curved guide unit are substantially symmetrical.

23. The swing device of claim 21, wherein the first member is formed by a top face of the main body housing and the second member is formed by a bottom face of the swing housing.

24. The swing device of claim 21, wherein the first guide unit is substantially perpendicular to the longitudinal direction of the first member.

* * * * *